May 18, 1937.  G. KEINATH  2,080,825
DEVICE FOR TESTING THE OPERATION OF TIMEPIECES
Filed April 19, 1935
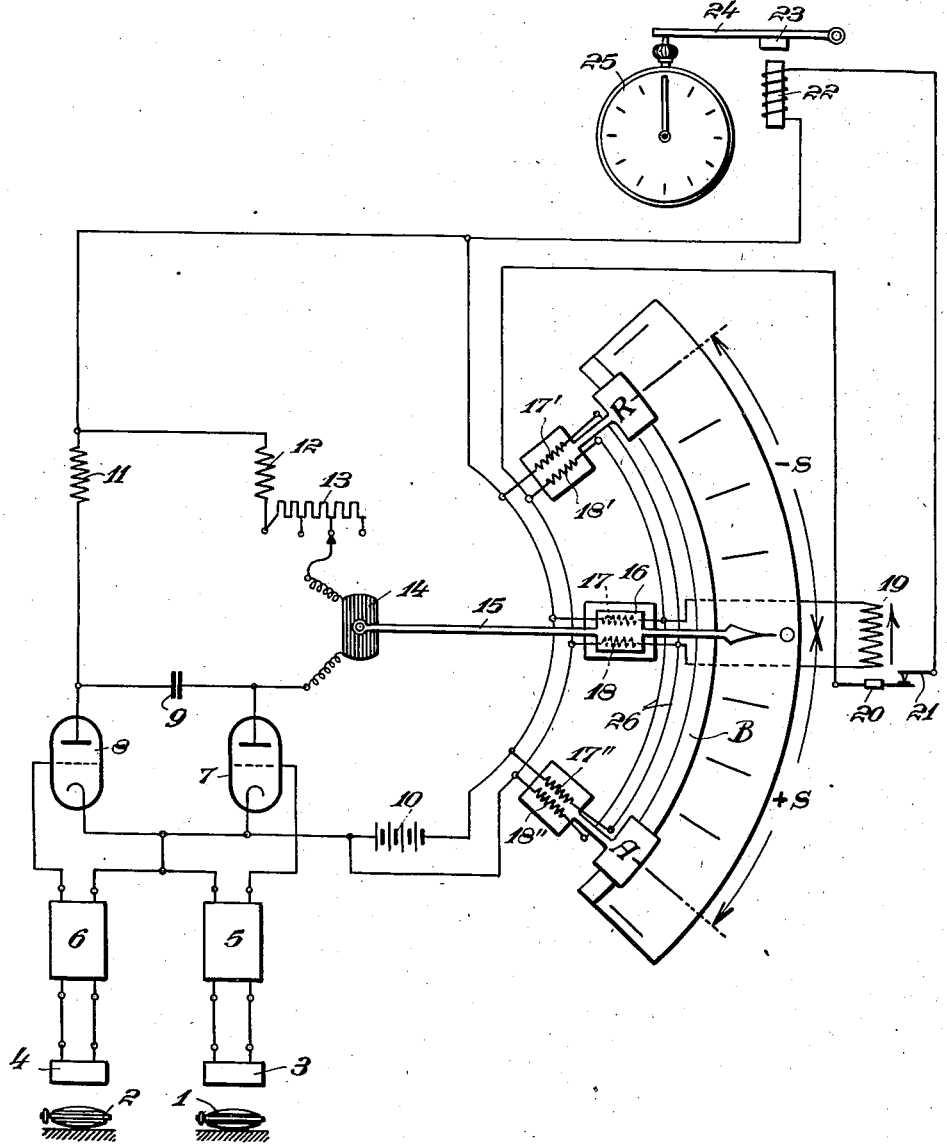
Inventor:
Georg Keinath
by Lothar Kehlenbeck
Attorneys Patented May 18, 1937

2,080,825

UNITED STATES PATENT OFFICE 2,080,825

DEVICE FOR TESTING THE OPERATION OF TIMEPIECES

Georg Keinath, Berlin-Charlottenburg, Germany, assignor to Siemens & Halske, Aktiengesellschaft, Siemensstadt, near Berlin, Germany, a corporation of Germany Application April 19, 1935, Serial No. 17,279
In Germany April 21, 1934

25 Claims. (Cl. 181—0.5)

My invention relates to a device for testing the operation of timepieces, particularly of such ones which are provided with a balance wheel, the phase difference between the frequency of the oscillations of the balance wheel and a standard frequency being indicated by a highly damped current measuring instrument. To this end, an arrangement has been proposed in which a series of impulses corresponding to the oscillating parts of the timepiece under test and of a standard timepiece respectively is produced and in which the phase shift between the two series of impulses is indicated by a current responsive instrument which is supplied from a power source, with current impulses the duration of which corresponds to the phase difference between the two series of impulses. For this purpose, preferably two relays are employed of which one, for instance, is energized in rhythm with the frequency of the timepiece under test, while the other is energized in rhythm with the standard frequency. Both relays are so connected as to influence one another in such a manner that the one is deenergized upon the energization of the other. If the indicating instrument is, consequently, inserted in the circuit controlled by the one relay, then the duration of the current impulses flowing through this instrument is dependent upon the phase shift between the two series of impulses. Every change in the deflection of the instrument indicates, therefore, a phase shift and from the direction of such change it may be readily ascertained whether the timepiece to be tested is running fast or slow. As relays, for instance, thermionic tubes may be employed, each tube being influenced by a series of impulses in such a manner that the ignition of the one tube causes the extinction of the other.

If a pointer which moves with respect to a fixed mark is controlled by the moving parts of the current responsive instrument the difference in operation between the timepiece under test and the standard timepiece may be determined by noting that at the beginning of the observation the pointer coincides with a fixed mark and then again observing the position of the pointer after the lapse of the time interval $t$. Assuming that the speed $v_x$ of the timepiece under test is constant and differs from the speed $v_n$ of the standard timepiece, the scale of the indicating instrument, referred to a predetermined standard time interval of observation $t$, may be so calibrated that the difference in speed may be read off from the scale in a suitable unit, for instance, in seconds per day. In this case the time interval of observation may conveniently be determined with the aid of a stop watch. It is, however, very difficult for the observer to read off the position of the pointer exactly at the moment when the time interval of observation to be indicated by the stop watch has elapsed. The inaccurate measurements caused thereby may be avoided according to the present invention by the use of a time registering device for determining the time, after the lapse of which the pointer starting from the fixed zero mark has traversed a predetermined distance $s$ in one direction or the other to a corresponding fixed end mark. As a time registering device preferably a stop watch is employed which may be started and stopped by hand or also electrically. The scale of the time registering device is then preferably figured in such a manner that the departure of the timepiece under test from the standard timepiece may be read off directly, for instance in seconds per day.

In order to avoid the inaccurate measurements occurring during the observation of the movement of the pointer and the corresponding release of the stop watch, the electric indicating instrument may, furthermore, be provided according to the invention with contact devices which are actuated by the pointer in its zero position or in one of its end positions and which serve to automatically start and stop the time registering device. In this case it is, as a rule, necessary to employ auxiliary devices controlled by the pointer as is usually the case with contact devices employed for sensitive measuring instruments.

An auxiliary device particularly suitable for this purpose consists of bolometric resistances arranged at the fixed marks and of a screen associated with the pointer, the resistances being preferably cooled by currents of air. The screen covers a portion of the bolometric resistances when the pointer is at the zero mark or at one of the end marks. In this case, an electrically operated time registering device is preferably employed and the bolometric resistances are so connected that the electric currents controlled by the same serve to start and stop, if desired through relays, the time registering device.

According to the above-described method the difference in operation of the timepiece under test is determined by the speed $v$ with which the pointer traverses the distance $s$. If $t$ denotes the time read off from the time registering device, then $$v = \frac{s}{t} \text{ or } t = \frac{s}{v}.$$

It follows that the time $t$ will be the greater, the smaller $v$ will be, i. e., the more accurate the timepiece under test runs. In order to shorten the time $t$ in such cases the range of measurement may be varied by reducing the range within which the pointer moves. To this end, the indicating or measuring instrument may be provided with various end marks or end contacts arranged at different intervals from the fixed zero mark or the end marks or end contacts may be slidably arranged, or, if desired, the sensitiveness of the current measuring instrument may be also varied. The indicating or measuring instrument is preferably provided with various scales depending upon the number of the ranges of measurement.

In the accompanying drawing an embodiment of the invention is shown in diagrammatic form. 1 denotes the watch under test and 2 a standard watch, the oscillations of the balance wheels of both watches having uniform frequencies, but the beat frequency of the watch 1 will in most cases differ from the standard beat frequency of the watch 2. 3 and 4 are two microphones which are influenced by the beats of both watches and 5 and 6 are amplifiers of the usual type. The current impulses caused by the beats of the watch 1 act on the grid of the thermionic tube 7 through the microphone 3 and the amplifier 5, and those caused by the beats of the standard watch 2 act on the grid of the thermionic tube 8. 9 is a condenser the terminals of which are connected to the anodes of the thermionic tubes 7 and 8 respectively. 10 denotes a source of electric current, 11 and 12 are resistances of constant value, 13 is a variable resistance and 14 is the pivoted coil of an electric indicating instrument whose movements are considerably damped by any well-known or approved means. One terminal of the source of current 10 is connected with one end of each of the resistances 11 and 12, the other terminal is connected with the cathodes of the tubes 7, 8 and also with one output terminal of each of the amplifiers 5, 6. The sensitiveness of the indicating instrument may be changed by means of the variable resistance 13.

The operation of the above-described parts is as follows: As soon as the first impulse produced by the beats of the watch 1 under test has started or "ignited" the thermionic tube 7, a current will pass from the source of electricity 10 through the resistances 12 and 13 and the pivoted coil 14 to the anode of said tube, through the tube, and then from its cathode back to said source of electricity. When thereupon the other tube 8 is started or ignited by an impulse produced by the beats of the standard watch 2, a current surge will flow to the anode of the tube 7 via the condenser 9, causing the tube 7 to be extinguished, while at the same time the current will pass through the other tube 8. At this moment therefore no current will be flowing through the coil 14 of the instrument, and such coil will receive current again only when the tube 7 is ignited by a subsequent impulse (which also extinguishes the tube 8 via the condenser 9). Thus there are transmitted to the pivoted coil 14, current impulses the duration of which corresponds to the time interval between two successive current impulses caused by the beats of the watches 1 and 2 respectively. The pointer 15 connected to the pivoted coil 14 will in this case take a position corresponding to the mean value which is dependent upon the ratio of the period during which current flows through the indicating or measuring instrument to the period during which the instrument is dead. By the choice of a sufficiently damped measuring instrument the pointer will remain normally stationary and will change its position only when there is a difference in frequency between the two series of impulses.

Assuming as above stated that the tube 7 is controlled by the frequency of the watch 1 under test, an increase of the angle of deflection of the instrument indicates that the current impulses caused by the beats of the standard watch lag behind those caused by the beats of the watch to be tested, that is to say, the frequency of the watch under test is higher than the standard frequency, whereas a decrease of the angle of deflection would indicate that the watch under test is running slow.

The pointer 15, which in the position shown is on the fixed zero mark, carries a screen 16 which in the position shown covers both bolometric resistances 17 and 18 arranged in parallel relation to each other. Two other pairs of bolometric resistances 17', 18' and 17", 18" which are connected to the same energy source 10 are arranged at the end marks A and R respectively which are distant +s and −s from the zero mark O. On the other hand, the resistances 17', 17" are connected with one another as well as with the resistance 18 and the resistances 18', 18" are connected with one another as well as with the resistance 17. The relay coil 19 is connected to the pairs of resistances 17—18, 17'—18' and 17"—18". The end marks R, A together with the resistances 17', 18', or 17", 18" respectively may be adjustable to different distances from the zero mark, so as to alter the intervals indicated at −s and +s respectively. For this purpose, the scale may be provided with an arcuate track or rib B, the said end marks being provided on slides which may be adjusted along such track. The armature 20 of the relay coil 19 connected to the one pole of the energy source 10, carries a contact cooperating with a counter-contact 21 connected to the other pole of the energy source 10 through the coil of an electromagnet 22. The latter when energized attracts an armature 23 secured to a pivotally mounted lever 24, whose free end engages the push button of a time registering device 25 here illustrated as a stop watch.

The bolometric resistances, which are preferably cooled in a well-known manner by devices (not shown) for the production of currents of air, form a bridge connection in which two opposite arms of the bridge are formed by the resistances 17 and 18 respectively while the other two arms are formed by the parallel-connected pairs of resistances 17', 17" and 18', 18" respectively. The bridge connection is so balanced that the current in the coil 19, which is connected in a diagonal of the bridge, will become zero when the screen does not cover any of the bolometric resistances. In this case, the armature 20 is released, breaking the circuit of the coil 22 at 21, so that the armature 23 will not be attracted. However, as soon as the pointer 15 reaches one of the marks O, A or R the bridge is brought out of equilibrium and a current is caused to flow in the relay coil 19, so that the armature 20 and, therefore, also the armature 23 will be attracted. If for instance the pointer 15, from a position in which its screen 16 is clear of all of the resistances 17, 18, 17', 18', 17", 18", moves toward the zero position, such screen will first cover one of the resistances 17 or 18, say the resistance 17, and owing to its being so covered, the resistance 17 will assume a higher temperature than when it was uncovered and therefore better able to radiate the heat imparted to it by the passage of the current. The increased temperature of the resistance 17 will cause a corresponding decrease in its conductivity, so that a smaller amount of current will pass through said resistance, while a larger portion of the current will pass through the resistances 17′ and 17″. The bridge being thus unbalanced, a current will pass (in the direction indicated by the arrow) through the coil 19 connected in a diagonal of the bridge, and the energizing of this coil will close the circuit at 20, 21, causing the coil 22 to be energized in turn to start the stop watch 25 as described. When the pointer 15 reaches the zero position illustrated, so as to cover the resistance 18 as well as the resistance 17, the unbalancing of the bridge will be intensified, in the same direction, so that the current passing through the coil 19 will be increased. Should the pointer 15 then continue to swing toward the mark A, the resistance 17 will be uncovered by the screen 16, causing the current passing through the coil 19 to be decreased, but such decreased current will still be sufficient to keep the contact closed at 20, 21. Only when the screen 16, during the movement of the pointer 15 toward the mark A, clears the resistance 18 as well as the resistance 17, will the bridge be restored to the balanced condition in which no current flows through the coil 19, so that the circuit of the coil 22 will be opened at 20, 21, but the stop watch 25 will continue to run until its button is pressed again. If the pointer 15 moves farther toward the mark A, so that the screen 16 covers the resistance 17″, the conductivity of this resistance will decrease (in the same manner as explained above for the resistance 17), and as a result of this, an increased current will pass through the resistance 17, the bridge thereby becoming unbalanced, so that current will flow through the coil 19 (in the direction opposite to that indicated by the arrow). The coil 19 being energized, the circuit of the coil 22 will be closed at 20, 21, to energize the coil 22 and again press the button of the stop watch 25, so that the latter is arrested. The effect obtained when the screen 16 covers the resistances 18″, 17′, or 18′ will be readily understood without further explanation.

From the above description it will be evident that as soon as the pointer 15 reaches the zero mark the button of the stop watch 25 is pressed in the downward direction by the lever 24, so that the pointer register of the stop watch is set in motion. If now the watch under test, for instance, runs faster than the standard watch, then the pointer 15 will move over the portion +s of the scale with a speed corresponding to the difference in operation of both watches, thus again establishing the equilibrium of the bridge and again releasing the armature 23. Only when the pointer has reached the mark A the bridge is again brought out of equilibrium, the coil 22 is energized through the contact 21 and, consequently, the button of the stop watch 25 is pressed in the downward direction for the second time by the lever 24. The pointer register of the stop watch is thereby caused to stop again, so that the time required for traversing the distance +s may be noted or by correspondingly figuring the scale the difference in operation of the watch under test may be directly read off in seconds per day. The operation will be similar if the watch under test lags behind the standard watch, except that in this case the pointer 15 will move in the opposite direction, toward the mark R, over the scale portion —s.

With the above-described arrangement it is irksome, particularly in the case of very small departures of the watch under test from the standard watch, if before commencing the measurement one has to wait until the pointer 15 of the measuring instrument has reached the zero mark. In this case it is preferable to arrange on the scale a plurality of fixed marks which are spaced from one another at equal intervals. The time registering device 25 is started in this case as soon as the pointer 15 reaches one of the fixed marks and is stopped when the next following mark is reached.

In this description, I have referred to the fact that the bolometric resistances are preferably cooled, in a well-known manner, by devices for the production of currents of air. Devices of this character are disclosed, for instance, in articles by Sell published in Zeitschrift für Technische Physik, vol. 5 (1924) page 573, and vol. 13 (1932) of the same periodical, page 320. As there explained, blasts or currents of cooling air are directed from suitable nozzles against the bolometric resistances as long as the latter are not covered by movable screens such as the one shown at 16 in the present application, and the screen in its movement is adapted to become interposed between the nozzle and the bolometric resistance so that at such time the cooling air current will be prevented from reaching the bolometric resistance.

I claim as my invention:

1. In an apparatus for testing the operation of timepieces a highly damped current responsive instrument, a source of electrical energy, means for producing a series of electrical impulses in accordance with the rhythm of the periodically moving parts of the timepiece under test, means for producing a second series of electrical impulses of a standard frequency which corresponds to that which the first-mentioned series of impulses exhibits on correct running of the timepiece under test, means for connecting the said instrument to the said source of electrical energy by each impulse of one of said series of impulses and for disconnecting said instrument from said source by each impulse of the other series of impulses, a pointer controlled by the said instrument, at least two marks lying within the range within which the pointer moves, and a time registering device for determining the time after the lapse of which the pointer has traversed a given distance in one direction or the other from one of said marks to the other.

2. In an apparatus for testing the operation of timepieces a highly damped current responsive instrument, a source of electrical energy, means for producing a series of electrical impulses in accordance with the rhythm of the periodically moving parts of the timepiece under test, means for producing a second series of electrical impulses of a standard frequency which corresponds to that which the first-mentioned series of impulses exhibits on correct running of the timepiece under test, means for connecting the said instrument to the said source of electrical energy by each impulse of one of said series of impulses and for disconnecting said instrument from said source by each impulse of the other series of impulses, a pointer controlled by the said instrument, at least two marks lying within the range within which the pointer moves, and a time registering device for determining the time after the lapse of which the pointer has traversed a given distance in one direction or the other from one of said marks to the other, the scale of the time registering device being so calibrated that the difference in operation between the timepiece under test and the standard timepiece may be directly read off.

3. In an apparatus for testing the operation of timepieces a highly damped current responsive instrument, a source of electrical energy, means for producing a series of electrical impulses in accordance with the rhythm of the periodically moving parts of the timepiece under test, means for producing a second series of electrical impulses of a standard frequency which corresponds to that which the first-mentioned series of impulses exhibits on correct running of the timepiece under test, means for connecting the said instrument to the said source of electrical energy by each impulse of one of said series of impulses and for disconnecting said intrument from said source by each impulse of the other series of impulses, a pointer controlled by the said instrument, at least two marks lying within the range within which the pointer moves, a time registering device, contact means operated by the pointer when the latter reaches one or the other of said marks, and means, controlled by said contact means, for alternately starting and stopping the time registering device.

4. In an apparatus for testing the operation of timepieces a highly damped current responsive instrument, a source of electrical energy, means for producing a series of electrical impulses in accordance with the rhythm of the periodically moving parts of the timepiece under test, means for producing a second series of electrical impulses of a standard frequency which corresponds to that which the first-mentioned series of impulses exhibits on correct running of the timepiece under test, means for connecting the said instrument to the said source of electrical energy by each impulse of one of said series of impulses and for disconnecting said instrument from said source by each impulse of the other series of impulses, a movable screen controlled by the said instrument, a time registering device, at least two bolometric resistance devices lying within the range within which the screen moves, and a control device for electrically starting and stopping the time registering device, said control device being connected to the bolometric resistance devices in such a manner that the time registering device is started when the screen covers one of the bolometric resistance devices and is stopped when it covers an adjacent bolometric resistance device.

5. In an apparatus for testing the operation of timepieces a highly damped current responsive instrument, a source of electrical energy, means for producing a series of electrical impulses in accordance with the rhythm of the periodically moving parts of the timepiece under test, means for producing a second series of electrical impulses of a standard frequency which corresponds to that which the first-mentioned series of impulses exhibits on correct running of the timepiece under test, means for connecting the said instrument to the said source of electrical energy by each impulse of one of said series of impulses and for disconnecting said instrument from said source by each impulse of the other series of impulses, a screen controlled by the moving parts of said instrument, a time registering device, a bolometric resistance device consisting of two parallel arranged resistances, at least two equal bolometric resistance devices at the left and right hand side of said bolometric resistance device, the bolometric resistance devices being connected to the said source in a bridge connection which is so balanced that the current in a diagonal of the bridge will disappear when the screen does not cover any of the bolometric resistance devices, a coil traversed by the current in said diagonal of the bridge, a circuit-closer controlled by said coil, and an electromagnet whose coil is included in the circuit controlled by said first circuit-closer and whose armature when moving alternately starts and stops the time registering device.

6. In an apparatus for testing the operation of timepieces a highly damped current responsive instrument, a source of electrical energy, means for producing a series of electrical impulses in accordance with the rhythm of the periodically moving parts of the timepiece under test, means for producing a second series of electrical impulses of a standard frequency which corresponds to that which the first-mentioned series of impulses exhibits on correct running of the timepiece under test, means for connecting the said instrument to the said source of electrical energy by each impulse of one of said series of impulses and for disconnecting said instrument from said source by each impulse of the other series of impulses, a movable screen controlled by the said instrument, a time registering device, a stationary and at least two shiftable bolometric resistance devices disposed at opposite sides of the stationary bolometric resistance device within the range within which the screen moves, and a control device for electrically starting and stopping the time registering device, said control device being connected to the bolometric resistance devices in such a manner that the time registering device is started when the screen covers the stationary bolometric resistance device and is stopped when it covers one of the shiftable bolometric resistance devices.

7. In an apparatus for testing the operation of timepieces a highly damped current responsive instrument, a source of electrical energy, means for producing a series of electrical impulses in accordance with the rhythm of the periodically moving parts of the timepiece under test, means for producing a second series of electrical impulses of a standard frequency which corresponds to that which the first-mentioned series of impulses exhibits on correct running of the timepiece under test, means for connecting the said instrument to the said source of electrical energy by each impulse of one of said series of impulses and for disconnecting said instrument from said source by each impulse of the other series of impulses, a movable screen controlled by the said instrument, a time registering device, at least three bolometric resistance devices lying within the range within which the screen moves, a device for electrically starting and stopping the time registering device, said device being connected to the bolometric resistance devices in such a manner that the time registering device is started when the screen covers one of the bolometric resistance devices and is stopped when it covers an adjacent bolometric resistance device, and means for changing the sensitiveness of the said instrument.

8. In an apparatus for testing the operation of timepieces a highly damped current responsive instrument, a source of electrical energy, means for producing a series of electrical impulses in accordance with the rhythm of the periodically moving parts of the timepiece under test, means for producing a second series of electrical impulses of a standard frequency which corresponds to that which the first-mentioned series of impulses exhibits on correct running of the timepiece under test, means for connecting the said instrument to the said source of electrical energy, by each impulse of one of said series of impulses and for disconnecting said instrument from said source by each impulse of the other series of impulses, a movable screen controlled by the said instrument, a time registering device, at least three bolometric resistance devices spaced from one another at equal intervals within the range within which the screen moves, and a control device for electrically starting and stopping the time registering device, said control device being connected to the bolometric resistance devices in such a manner that the time registering device is started when the screen covers one of the bolometric resistance devices and is stopped when it covers an adjacent bolometric device.

9. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a current-responsive instrument, means for rendering said instrument active by each impulse of one of said series of impulses and inactive by each impulse of the other series, a screen operatively connected with said instrument, a heat-sensitive resistance device arranged to be covered or uncovered by said screen, a time registering device, and means, controlled by the action of said screen on the heat-sensitive resistance device, for controlling said time registering device.

10. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen, means for actuating said screen in accordance with the relative frequencies of said two series of impulses, a heat-sensitive resistance device arranged to be covered or uncovered by said screen, a time registering device, and means, governed by the action of said screen on the heat-sensitive resistance device, for controlling said time-registering device.

11. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen, means for actuating said screen in accordance with the relative frequencies of said two series of impulses, two heat-sensitive resistance devices arranged to be covered or uncovered successively by said screen, a time registering device, and means, controlled by the action of said screen on said resistance devices, for starting said time registering device when the screen covers one of the said resistance devices and stopping said time registering device when the screen covers the other of said resistance devices.

12. An apparatus according to claim 11, in which the distance between the two resistance devices is adjustable.

13. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen, means for actuating said screen in accordance with the relative frequencies of said two series of impulses, three heat-sensitive resistance devices arranged in sequence and adapted to be covered or uncovered by said screen, a time registering device, and means, controlled by the action of said screen on said resistance devices, for starting said time registering device when the screen covers the intermediate one of said heat-sensitive resistance devices and stopping said time registering device when the screen covers either one of the other resistance devices.

14. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen, means for actuating said screen in accordance with the relative frequencies of said two series of impulses, a heat-sensitive resistance device arranged to be covered or uncovered by said screen, and indicating means controlled by said resistance device.

15. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen, means for actuating said screen in accordance with the relative frequencies of said two series of impulses, two heat-sensitive resistance devices arranged to be covered or uncovered successively by said screen, and indicating means controlled by said resistance devices.

16. An apparatus according to claim 15, in which the distance between the two resistance devices is adjustable.

17. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a heat-sensitive resistance device, connections for supplying a heating current to said device, a screen adapted to cover or uncover said resistance device to impede or permit heat-radiation therefrom, means for actuating said screen in accordance with the relative frequencies of said two series of impulses, and indicating means controlled by said resistance device.

18. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, two heat-sensitive resistance devices, connections for supplying a heating current to said devices, a screen adapted to cover or uncover said resistance devices successively to impede or permit heat-radiation therefrom, means for actuating said screen in accordance with the relative frequencies of said two series of impulses, and indicating means controlled by said resistance devices.

19. An apparatus according to claim 18, in which the distance between the two resistance devices is adjustable.

20. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a movable member, means for actuating said member in accordance with the relative frequencies of said two series of impulses, and means for determining the time taken by said member in traveling a predetermined distance.

21. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen movable to control a cooling current, means for actuating said screen in accordance with the relative frequencies of said two series of impulses, a heat-sensitive resistance device arranged to be exposed to the action of said cooling current or shielded therefrom according to the position of said screen, a time-registering device, and means, governed by the action of said screen on the heat-sensitive device, for controlling said time-registering device.

22. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen movable to control a cooling current, means for actuating said screen in accordance with the relative frequencies of said two series of impulses, two heat-sensitive resistance devices arranged to be successively exposed to the action of said cooling current or shielded therefrom according to the position of said screen, a time-registering device, and means, controlled by the action of said screen on said resistance devices, for starting the time-registering device when the screen shields one of said resistance devices and stopping the time-registering device when the screen shields the other of said resistance devices.

23. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen movable to control a cooling current, means for actuating said screen in accordance with the relative frequencies of said two series of impulses, three heat-sensitive resistance devices arranged in sequence and arranged to be exposed to the action of said cooling current or shielded therefrom according to the position of said screen, a time-registering device, and means, controlled by the action of said screen on said resistance devices, for starting said time-registering device when the screen shields the intermediate one of said heat-sensitive resistance devices and stopping said time-registering device when the screen shields either one of the other resistance devices.

24. In an apparatus for testing the operation of timepieces, means for producing in connection with a timepiece under test, a series of electrical impulses in acordance with the rhythm of the periodically moving parts of such timepiece, means for producing a second series of electrical impulses of a standard frequency which corresponds to that which the first mentioned series of impulses will exhibit on the correct running of the timepiece under test, a screen movable to control a cooling current, means for actuating said screen in accordance with the relative frequencies of said two series of impulses, a heat-sensitive resistance device arranged to be exposed to the action of said cooling current or shielded therefrom according to the position of said screen, and indicating means controlled by said resistance device.

25. In an apparatus for testing the operation of timepieces, means for producing in connection with a timepiece under test, a series of electrical impulses in accordance with the rhythm of the periodically moving parts of such timepiece, means for producing a second series of electrical impulses of a standard frequency which corresponds to that which the first mentioned series of impulses will exhibit on the correct running of the timepiece under test, a screen movable to control a cooling current, means for actuating said screen in accordance with the relative frequencies of said two series of impulses, two heat-sensitive resistance devices arranged to be successively exposed to the action of said cooling current or shielded therefrom according to the position of said screen, and indicating means controlled by said resistance devices.

GEORG KEINATH.